(12) United States Patent
Matsuki

(10) Patent No.: US 7,742,449 B2
(45) Date of Patent: Jun. 22, 2010

(54) HANDOVER FUNCTION TESTING METHOD AND SPECTRUM SPREAD MOBILE COMMUNICATIONS SYSTEM

(75) Inventor: Toru Matsuki, Tokyo (JP)

(73) Assignee: NEC Corporation, Tokyo (JP)

( * ) Notice: Subject to any disclaimer, the term of this patent is extended or adjusted under 35 U.S.C. 154(b) by 537 days.

(21) Appl. No.: 10/552,742

(22) PCT Filed: Apr. 13, 2004

(86) PCT No.: PCT/JP2004/005241

§ 371 (c)(1),
(2), (4) Date: Mar. 31, 2006

(87) PCT Pub. No.: WO2004/093349

PCT Pub. Date: Oct. 28, 2004

(65) Prior Publication Data

US 2006/0239228 A1    Oct. 26, 2006

(30) Foreign Application Priority Data

Apr. 14, 2003    (JP) .............................. 2003-108914

(51) Int. Cl.
*H04Q 7/00* (2006.01)
(52) U.S. Cl. ................. 370/331; 370/333; 370/334; 370/332; 455/436; 455/439; 455/438; 455/440
(58) Field of Classification Search ............... 455/522, 455/439, 436, 438, 440; 370/332, 331, 333, 370/334
See application file for complete search history.

(56) References Cited

U.S. PATENT DOCUMENTS 6,496,493 B1 * 12/2002 Chung ...................... 370/332
6,539,233 B1    3/2003 Taketsugu
2002/0119772 A1    8/2002 Yoshida
2006/0068826 A1 *    3/2006 Leonard .................... 455/522

(Continued)

FOREIGN PATENT DOCUMENTS

JP    11-074832    3/1999

(Continued)

*Primary Examiner*—Vincent P Harper
*Assistant Examiner*—Fred A Casca
(74) *Attorney, Agent, or Firm*—Foley & Lardner LLP

(57) ABSTRACT

At least a mobile terminal 10, base station radio apparatuses 20a and 20b that communicate with the mobile terminal 10, and a radio base station control apparatus 30 that controls the transmission powers of the base station radio apparatuses 20a and 20b are at least provided. When a handover function test is performed between cells that are covered by the base station radio apparatuses 20a and 20b, the radio base station control apparatus 30 calculates a difference between the levels of the reception fields of the base station radio apparatuses 20a and 20b that cover the cells for which the handover test of the mobile terminal 10 is to be performed. Then, the radio base station control apparatus 30 controls the transmission powers of the base station radio apparatuses 20a and 20b so that the difference is equal to or smaller than a predetermined threshold value. Thereafter, the radio base station control apparatus 30 performs the handover function test between the cells covered by the base station radio apparatuses 20a and 20b, the difference between the levels of the reception fields from which is equal to or smaller than the threshold value.

9 Claims, 2 Drawing Sheets

U.S. PATENT DOCUMENTS

2006/0094432 A1* 5/2006 Chang et al. ................ 455/439

FOREIGN PATENT DOCUMENTS

| JP | 11-355201 | 12/1999 |
| JP | 2000-209166 A | 7/2000 |
| JP | 2002-252588 A | 9/2002 |
| KR | 2000-0057723 | 9/2000 |
| KR | 2001-0048893 | 6/2001 |
| WO | WO 98/11677 | 3/1998 |
| WO | WO 98/56200 | 12/1998 |

* cited by examiner

HANDOVER FUNCTION TESTING METHOD AND SPECTRUM SPREAD MOBILE COMMUNICATIONS SYSTEM

TECHNICAL FIELD

The present invention relates to a method for testing a handover function for a spectrum spread mobile communication system, and a spectrum spread mobile communication system.

BACKGROUND ART

For a spectrum spread mobile communication system, when a soft/softer handover testing function between two cells is to be performed, a location must be searched for whereat a transmission wave can be received from two base station radio apparatuses that cover these two cells, and whereat an electric field environment is a soft/softer handover enabled environment.

However, it is difficult for a requested soft/softer handover area between cells to be searched for in an actual field, because the radio environment can not be predicted.

It is also believed that a soft/softer handover test can be performed while a radio environment is being searched for by employing, for the test, a measurement device that can measure the radio environment. As disadvantages in this case, a measurement device for measuring the radio environment is necessary and time for finding the radio environment is required.

Thus, there has been proposed a base station testing apparatus of a CDMA type, for example, that reproduces the softer handover state between arbitrary sectors by controlling three coupling levels between the mobile terminal of the base station testing apparatus and multiple sector compatible transmitter/receivers of a base station, i.e., a coupling level indicating the best call connection state, a coupling level indicating a call connection start enabling state and a coupling level indicating a call disconnection state, and that can perform a softer handover function test by reproduction of this softer handover state (see, for example, Japanese Patent Laid-Open Publication No. 2002-252588).

However, when a handover function test is to be conducted using the above described testing apparatus, not only is such a testing apparatus required, but also there is a problem in that the control process may become complicated, because three coupling levels, i.e., the coupling level for the best call connection state, the coupling level for the call connection start enabling state and the coupling level for the call disconnection level, must be controlled between the mobile terminal of the base station testing apparatus that performs the test and the multiple sector compatible transmitter/receivers of the base station.

DISCLOSURE OF THE INVENTION

While taking the above described problems of the conventional example into account, the objectives of the present invention is to provide a handover function testing method, whereby a soft/softer handover function test can easily be performed in a field within a short period of time, and a spectrum spread mobile communication system.

To achieve these objectives, according to the present invention, a handover testing method, whereby a mobile communication system, which at the least includes a mobile station, base station radio apparatuses that perform communication with the mobile station and a radio base station control apparatus that controls transmission powers for the base station radio apparatuses, performs a handover function test between cells covered by the base station radio apparatuses, is characterized by:

calculating a difference between levels of reception fields for the base station radio apparatuses that cover the cells for which the handover test of the mobile terminal is to be performed; controlling transmission powers of the base station radio apparatuses so that a difference is equal to or smaller than a predetermined threshold value; and performing the handover function test between the cells covered by the base station radio apparatuses, the difference between the levels of the reception fields of which is equal to or smaller than the threshold value.

Furthermore, the handover function testing method is characterized by controlling the transmission power of the base station radio apparatus for which the difference has been calculated and for which the level of the reception field is high, so that the difference is equal to or smaller than the predetermined value.

In addition, the handover function testing method is characterized by comprising:

a process for measuring reception field levels of the mobile terminal;

a process for notifying the radio base station control apparatus of the measured reception field levels;

a process for calculating a difference between the reception field levels that are notified;

a process for comparing a difference in the thus calculated reception field levels with the threshold value;

a process for, when the difference is greater than the threshold value, calculating an adjusted value to control transmission powers of the base station radio apparatuses, so that the difference is equal to or smaller than a predetermined threshold value; and a process for employing the adjusted value to control the transmission powers of the base station radio apparatuses.

Further, a spectrum spread mobile communication system, wherein mobile station, base station radio apparatuses that perform communication with the mobile station and a radio base station control apparatus that controls transmission powers for the base station radio apparatuses are at the least provided, and wherein a handover function test is performed between cells covered by the base station radio apparatuses, is characterized in that:

the radio base station control apparatus calculates a difference between levels of reception fields for the base station radio apparatuses that cover the cells for which the handover test of the mobile terminal is to be performed; control is provided for transmission powers of the base station radio apparatuses so that the difference is equal to or smaller than a predetermined threshold value; and the handover function test is performed between the cells covered by the base station radio apparatuses, for which the difference between the levels of the reception fields is equal to or smaller than the threshold value.

Furthermore, the spectrum spread mobile communication system is characterized in that the radio base station control apparatus controls the transmission power of the base station radio apparatus, for which the difference has been calculated and for which the level of the reception field is high, so that the difference is equal to or smaller than the predetermined value.

In addition, the spectrum spread mobile communication system is characterized in that the radio base station control apparatus includes:

reception field level determination means, for identifying reception field levels at the mobile terminal;

reception field level difference calculation means, for calculating a difference in the reception field levels identified by the reception field level determination means;

reception field level difference comparison means, for comparing the difference in the reception field levels obtained by the reception field level difference calculation means with the threshold value;

adjusted value calculation means, for, when as the comparison result obtained by the reception field level difference comparison means a difference is greater than the threshold value, calculating an adjusted value to control the transmission powers of the base station radio apparatuses, so that the difference is equal to or smaller than a predetermined value;

transmission power control value calculation means, for employing the adjusted value obtained by the adjusted value calculation means to calculate a transmission power control value for controlling the transmission powers of the base station radio apparatuses; and transmission power control means, for controlling the transmission powers of the base station radio apparatuses based on the transmission power control values obtained by the transmission power control value calculation means.

BEST MODE FOR CARRYING OUT THE INVENTION

Figure 1:
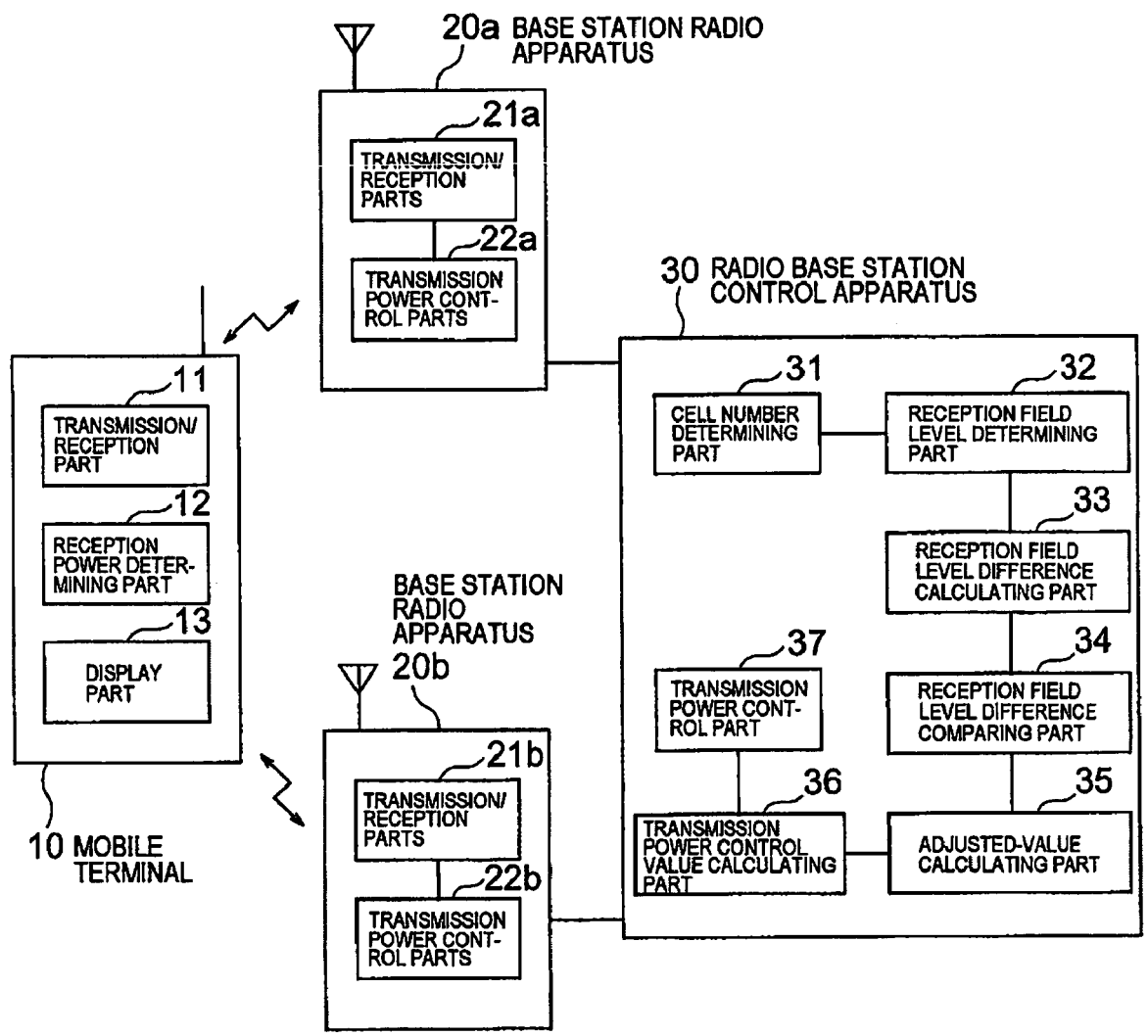
FIG. 1 is a diagram showing one mode for a spectrum spread mobile communication system that can achieve a handover function testing method according to the present invention.

One mode of the present invention will now be described while referring to the drawings.

FIG. 1 is a diagram showing one mode for a spectrum spread mobile communication system that can achieve a handover function testing method according to the present invention.

As shown in FIG. 1, the spectrum spread mobile communication system of this mode includes: a mobile terminal 10, such as a portable terminal or an automobile phone; base station radio apparatuses 20a and 20b, which cover cells wherein the mobile terminal 10 can perform communication and which communicate with the mobile terminal 10 in these cells; and a radio base station control apparatus 30, which controls the operations of the base station radio apparatuses 20a and 20b and which includes soft/softer handover function testing modes and inhibits the mode setup function by the base station radio apparatuses 20a and 20b before or during a normal service operation.

Only one mobile terminal 10 is shown in the drawing; actually, however, multiple mobile terminals are present. Further, only two base station radio apparatuses 20a and 20b are shown in the drawing; actually, however, multiple base station radio apparatuses are connected to the radio base station control apparatus 30.

The mobile terminal 10 includes a transmission/reception part 11, for exchanging signals with the base station radio apparatuses 20a and 20b; a reception power determining part 12, for measuring, for individual cells, reception powers for signals received from the base station radio apparatuses 20a and 20b, and for notifying the radio base station control apparatus 30, through the base station radio apparatuses 20a and 20b, of the measurement results; and a display part 13, for displaying the cell number of a cell in a soft/softer handover state.

Further, the base station radio apparatuses 20a and 20b respectively include: transmission/reception parts 21a and 21b, for exchanging signals with the mobile terminal 10; and transmission power control parts 22a and 22b, for controlling the transmission powers of the transmission/reception parts 21a and 21b under the control of the radio base station control apparatus 30.

Moreover, the radio base station control apparatus 30 includes: a cell number determining part 31 for, when the soft/softer handover function testing mode is set, determining a cell number for which the soft/softer handover test, in the field, is to be performed; a reception field level determining part 32, for identifying reception field levels of the mobile terminal 10 in individual cells, which is reported by the mobile terminal 10; a reception field level difference calculating part 33, for calculating a difference between the reception field levels of the mobile terminal 10 in cells that are identified by the reception field level determining part 32; a reception field level difference comparing part 34, for comparing, with a predetermined threshold value, the difference in the reception field level obtained by the reception field level difference calculating part 33; an adjusted-value calculating part 35, for calculating an adjusted value, so that the difference in the reception field level obtained by the reception field level difference calculating part 33 is equal to or smaller than a predetermined threshold value; a transmission power control value calculating part 36, for employing the adjusted value obtained by the adjusted value calculating part 35 to calculate a transmission power control value used to control the transmission powers of the base station radio apparatuses 20a and 20b; and a transmission power control part 37, for controlling the transmission powers of the base station radio apparatuses 20a and 20b based on the transmission power control values obtained by the transmission power control value calculating part 36.

An explanation will now be given for the handover function testing method performed by the spectrum spread mobile communication system having the above described configuration.

Figure 2:
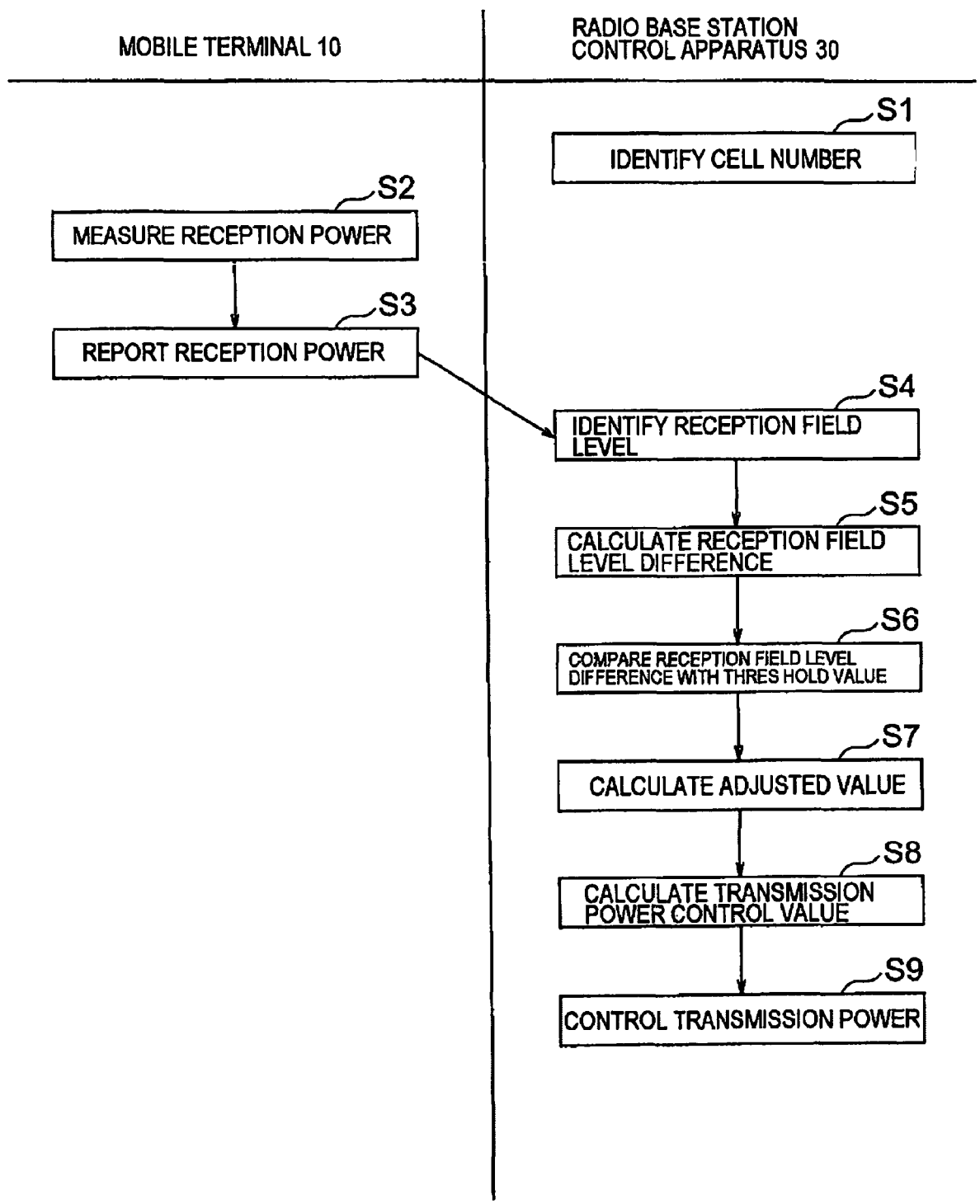
FIG. 2 is a flowchart for explaining the handover function testing method performed by the spectrum spread mobile communication system shown in FIG. 1.

FIG. 2 is a flowchart for explaining the handover function testing method performed by the spectrum spread mobile communication system shown in FIG. 1.

First, when cell numbers, for which the soft/softer handover function test, in the field, is to be performed, are entered in the radio base station control apparatus 30, the cell number determining part 31 of the radio base station control apparatus 30 identifies the cell numbers for which the soft/softer handover function test, in the field, is to be performed (step S1). It should be noted that, in this mode, the cell numbers of cells covered by the base station radio apparatuses 20a and 20b are entered and identified.

Further, when the mobile terminal 10 receives signals from the base station radio apparatuses 20a and 20b, the reception power determining part 12 of the mobile terminal 10 measures the initial reception powers of the mobile terminal 10 for the individual signals transmitted by the base station radio apparatuses 20a and 20b (step S2), and notifies the radio base station control apparatus 30, through the base station radio apparatuses 20a and 20b, of the initial reception powers that have been measured (step S3). At this time, assume that the transmission powers of the base station radio apparatuses 20a and 20b are P(A0) and P(B0), and that the initial reception powers of the mobile terminal 10 for the signals transmitted by the base station radio apparatuses 20a and 20b are L(A0) and L(B0). Since losses in transfers from the base station radio apparatuses 20a and 20b to the mobile terminal 10 differ, the initial reception power L(A0) of the mobile terminal 10 for a signal received from the base station radio apparatus 20a is not the same as the initial reception power L(B0) of the mobile terminal 10 for a signal received from the base station radio apparatus 20b, while the transmission power P(A0) of the base station radio apparatus 20a and the transmission power P(B0) of the base station radio apparatus 20b are the same.

In the radio base station control apparatus 30, the reception field level determining part 32 identifies, among the initial reception field levels reported by the mobile terminal 10, the initial reception field levels L(A0) and L(B0) of the cells indicated by the cell numbers identified at step S1, i.e., cells indicated by cell numbers covered by the base station radio apparatuses 20a and 20b (step S4).

Then, the reception field level difference calculating part 33 of the radio base station control apparatus 30 calculates a difference between the initial reception field levels L(A0) and L(B0) identified at step S4 (step S5). In this mode, the relation of the initial reception field level L(A0) and L(B0) is established as L(A0)>L(B0). The radio base station control apparatus 30 selects, as a line for communication with the mobile terminal 10; the base station radio apparatus 20a that supplies the initial reception field level L(A0), which is the highest initial reception field level at the mobile terminal 10.

Following this, the reception field level difference comparing part 34 of the radio base station control apparatus 30 compares the difference between the initial reception field levels L(A0) and L(B0), which is obtained at step S5, with a threshold value T that is designated in advance for the reception field level difference comparing part 34 (step S6). When L(A0)−L(B0)≦T is established, the base station radio apparatus 20b that supplies the initial reception field level L(B0) is also selected as a line for communication with the mobile terminal 10.

Further, when L(A0)−L(B0)>T is established as a result of the comparison of the difference between the initial reception field levels L(A0) and L(B0), which is obtained at step S5, with the threshold value T, the radio base station control apparatus 30 does not select, as a line for communication with the mobile terminal 10, the base station radio apparatus 20b that supplies the initial reception field level L(B0). That is, in order to test, in accordance with the field level, the soft handover function between the cells that are covered by the base station radio apparatuses 20a and 20b, L(A0)−L(B0)≦T is required.

Thus, the adjusted value calculating part 35 of the radio base station control apparatus 30 calculates such an adjusted value ΔL that L(A0)−L(B0)−ΔL≦T (step S7).

Sequentially, the transmission power control value calculating part 36 of the radio base station control apparatus 30 calculates such a transmission power control value that the value of the transmission power of the base station radio apparatus 20a is lower than P(A0) by the adjusted value ΔL (step S8).

Thereafter, P(A1), that is, P(A0)−ΔL is set for the transmission power of the base station radio apparatus 20a under the control of the transmission power control part 37, of the radio base station control apparatus 30, based on the transmission power control value (step S9). As a result, the levels at the mobile terminal 10 of the reception fields for the base station radio apparatuses 20a and 20b are L(A1) and L(B0).

The mobile terminal 10 notifies the radio base station control apparatus 30, through the base station radio apparatuses 20a and 20b, that L(A1) and L(B0) are the reception powers for the cells for which the soft/softer handover function test is to be performed. The radio base station control apparatus 30 selects the base station radio apparatus 20b as a line for communication with the mobile terminal 10. Accordingly, the base station radio apparatus 20b that could not be set to the soft/softer handover state is automatically designated for the soft/softer handover state.

In this mode, the level of the reception field at the mobile terminal 10 has been employed as a threshold value for the execution of the soft/softer handover. However, Eb/NO may be employed. In this case, the mobile terminal 10 notifies the radio base station control apparatus 30, through the base station radio apparatuses 20a and 20b, of the reception Eb/NO of the transmission waves of the base station radio apparatuses 20a and 20b. When a function for controlling the transmission powers of the base station radio apparatuses 20a and 20b is provided for the radio base station control apparatus 30 and the base station radio apparatuses 20a and 20b, so that the mobile terminal 10 can obtain the reception Eb/NO for which soft/softer handover is enabled, the soft/softer handover test can be easily performed in accordance with the field level.

As described above, according to the present invention, a mobile communication system, wherein a mobile terminal, base station radio apparatuses that communicate with the mobile terminal and a radio base station control apparatus that controls transmission powers of the base station radio apparatuses are at the least provided, calculates a difference between the levels of reception fields for the base station radio apparatuses that cover cells for which a handover test for the mobile terminal is to be performed; controls the transmission powers of the base station radio apparatuses, so that an obtained difference is equal to or smaller than a predetermined threshold value; and performs a handover function test between cells covered by the base station radio apparatuses, the difference in the reception fields of which is equal to or smaller than the threshold value. Therefore, without a special measurement device, a soft/softer handover function test, in accordance with the field level, can be performed easily and within a short period of time.

The invention claimed is:

1. A method for testing a handover function between cells covered by a plurality of base station radio apparatuses in a mobile communication system, the mobile communication system comprising a mobile station, the plurality of base station radio apparatuses each configured to perform communication with the mobile station, and a radio base station control apparatus configured to control transmission powers for the plurality of base station radio apparatuses, the method comprising:

receiving a plurality of reception power levels measured by the mobile station, wherein each of the plurality of reception powers levels is associated with a different one of the plurality of base station radio apparatuses;

calculating a difference between two of the plurality of reception power levels for two of the plurality of base station radio apparatuses;

comparing the calculated difference with a predetermined threshold value;

if the calculated difference is greater than the predetermined threshold:

controlling transmission power of one of the two of the plurality of base station radio apparatuses so that the difference becomes equal to or smaller than the predetermined threshold value; and performing a handover function test between cells covered by the two of the plurality of base station radio apparatuses.

2. A method according to claim 1, wherein the process of controlling transmission power of one of the two of the plurality of base station radio apparatuses comprises controlling the transmission power of the base station radio apparatus which has the higher received reception power.

3. A method according to claim 1, wherein if the calculated difference is equal to or less than the predetermined threshold:

performing a handover function test between cells covered by the two of the plurality of base station radio apparatuses without controlling transmission power of one of the two of the plurality of base station radio apparatuses.

4. A mobile communication system comprising:

a mobile station configured to transmit a plurality of reception power levels measured by the mobile station, wherein each of the plurality of reception powers levels is associated with a different one of a plurality of base station radio apparatuses;

the plurality of base station radio apparatuses configured to perform communication with the mobile station; and a radio base station control apparatus configured to control transmission power for the plurality of base station radio apparatuses, and further configured to perform a handover function test between cells covered by the plurality of base station radio apparatuses, wherein the radio base station control apparatus is configured to receive the plurality of reception power levels measured by the mobile station and calculate a difference between two of the plurality of reception power levels for two of the plurality of base station radio apparatuses;

wherein the radio base station control apparatus is configured to compare the calculated difference with a predetermined threshold value, and if the calculated difference is greater than the predetermined threshold:

the radio base station control apparatus is configured to control transmission power of one of the two of the plurality of base station radio apparatuses so that the difference becomes equal to or smaller than a predetermined threshold value, and perform a handover function test between the cells covered by the two of the plurality of base station radio apparatuses.

5. A mobile communication system according to claim 4, wherein the radio base station control apparatus is configured to control the transmission power of the one of the two of the plurality of base station radio apparatuses which has the higher received reception power level.

6. A mobile communication system according to claim 5, wherein if the calculated difference is equal to or less than the predetermined threshold:

the radio base station control apparatus is configured to perform a handover function test between cells covered by the two of the plurality of base station radio apparatuses without controlling transmission power of one of the two of the plurality of base station radio apparatuses.

7. A radio base station control apparatus configured to perform a handover function test between cells, comprising:

an interface configured to receive a plurality of reception power levels measured by a mobile station, wherein each of the plurality of reception powers levels is associated with a different one of a plurality of base station radio apparatuses;

a reception field difference calculating part configured to calculate a difference between two of the plurality of reception power levels for two of the plurality of base station radio apparatuses;

a reception field difference comparing part configured to compare the calculated difference with a predetermined threshold value; and a transmission power control part, wherein if the calculated difference is greater than the predetermined threshold:

the transmission power control part is configured to control transmission power of one of the two of the plurality of base station radio apparatuses so that the difference becomes equal to or smaller the predetermined threshold value.

8. A radio base station control apparatus according to claim 7, wherein the radio base station control apparatus is configured to perform a handover function test between the cells covered by the two of the plurality of base station radio apparatuses.

9. A radio base station control apparatus according to claim 7, wherein the transmission power control part is configured to control the transmission power of the one of the two of the plurality of base station radio apparatus which has the higher received reception power level.

* * * * *